ns Patent [19]

Neugebauer et al.

[11] Patent Number: 4,882,410

[45] Date of Patent: Nov. 21, 1989

[54] MOLDING COMPOUNDS COMPRISING A THERMOPLASTICALLY PROCESSIBLE AROMATIC POLYESTER IMIDE

[75] Inventors: Wolfgang Neugebauer, Marl; Heinz-Guenter Poll, Hilden, both of Fed. Rep. of Germany

[73] Assignee: Huels Aktiengesellschaft, Marl, Fed. Rep. of Germany

[21] Appl. No.: 247,267

[22] Filed: Sep. 21, 1988

[30] Foreign Application Priority Data

Jan. 28, 1988 [DE] Fed. Rep. of Germany ....... 3802511

[51] Int. Cl.$^4$ .............................................. C08G 73/16
[52] U.S. Cl. .................... 528/170; 528/125; 528/128; 528/171; 528/173
[58] Field of Search ............... 528/125, 128, 170, 171, 528/173, 353

[56] References Cited

U.S. PATENT DOCUMENTS 4,206,261 6/1980 Laganis et al. ................ 528/170
4,762,906 8/1988 Hisgen et al. ................ 528/170
4,801,676 1/1989 Hisgen et al. ................ 528/170

FOREIGN PATENT DOCUMENTS 3542796 6/1987 Fed. Rep. of Germany ...... 528/170
3542797 6/1987 Fed. Rep. of Germany ...... 528/170
3542833 6/1987 Fed. Rep. of Germany ...... 528/170

Primary Examiner—Harold D. Anderson
Assistant Examiner—T. Mosley
Attorney, Agent, or Firm—Oblon, Spivak, McClelland, Maier & Neustadt

[57] ABSTRACT

A molding compound, comprising a thermoplastically processible, aromatic polyester imide containing monomer units corresponding to the following starting monomers:

(A) 10-70 mole % HO—Ar—COOH
(B) 0-44 mole % HOOC-Ar'—COOH
(C) 15-45 mole % HO—Ar"—OH, and
(D) 1-45 mole % of a compound having the structure

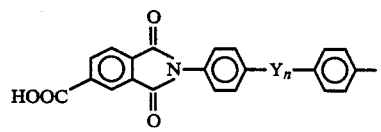

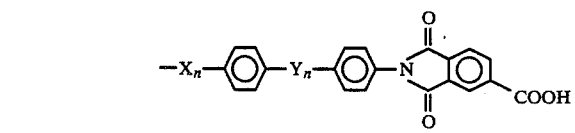

wherein Ar, Ar' and Ar" are the same or different; and are 1,3- or 1,4-phenylene; 1,4-, 1,5-, 2,6- or 2,7-naphthylene or

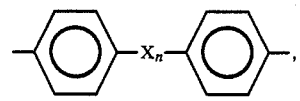

Y is —O— or —S—; X is —O—, —S—, —SO$_2$—, —CR$_2$—, or —CO—; R is H, C$_1$–C$_4$-alkyl; and n is 0 or 1; and wherein all quantities relate to the sum of A-D, and said sum equals 100 mole %, whereby the molar ratio of (B+D): C ranges from 0.9:1 to 1.1:1.

14 Claims, No Drawings

MOLDING COMPOUNDS COMPRISING A THERMOPLASTICALLY PROCESSIBLE AROMATIC POLYESTER IMIDE

BACKGROUND OF THE INVENTION

1. Field of the Invention:

The invention relates to molding compounds containing a thermoplastically processible, aromatic polyester imide.

2. Discussion of the Background:

Liquid crystalline polyester imides are known. However, they are unsatisfactory in light of their color and their low crystallinity. Thus in DE-OS No. 29 50 939 polyester imides comprising 4-(4'-carboxyphthalimido)-benzoic acid, 2,6-naphthalenedicarboxylic acid and a chloro- or alkyl-substituted hydroquinone or 4-(4'hydroxyphthalimido)phenol, 2,6-naphthalenedicarboxylic acid and a chloro- or alkylsubstituted terephthalic acid are described. Similarly in U.S. 4,383,105, instead of naphthalenedicarboxylic acid, 6-hydroxy-2-naphthalenecarboxylic acid is added. The monomers are difficult to obtain so that the polymers are uninteresting from a commercial point of view.

Polyester imides, which contain groups of $C_8$-$C_{16}$ alkylene-alpha, omega-bis-trimellitic acid imides (DE-OS No. 35 16 427) or $C_2$-$C_{12}$ alkylene-alpha, omega-bistrimellitic acid imides (EP-OS No. 0,213,362), do not exhibit the desired high thermal stability.

From DE-OS No. 35 42 857 and in EP-OS No. 0,225,537 polyester imides are known that are derived from bistrimellitic acid imides of mononuclear or binuclear diamines.

SUMMARY OF THE INVENTION

One object of the invention is to provide aromatic polyester imides that are liquid crystalline preferably in the melt and that exhibit a combination of good melt flow properties, excellent impact and notch resistance, high rigidity and high thermal stability.

This and other projects which will become apparent from the following specification have been achieved by the present molding compound which comprises a polyester that contains monomer units corresponding to the following starting monomers:

A. 10–70 mole % HO—Ar—COOH
B. 0–44 mole % HOOC—Ar'—COOH
C. 15–45 mole % HO—"Ar"—OH
D. 1–45 mole % of a compound having the structure

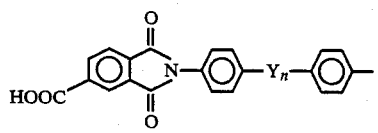

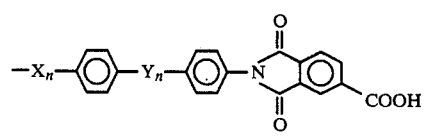

wherein Ar, Ar' and Ar" can be the same or different; and Ar, Ar', Ar" denote 1,3- or 1,4-phenylene; 1,4-, 1,5-, 2,6- or 2,7-naphthylene or

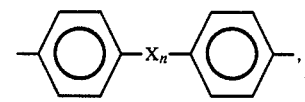

Y denotes —O— or —S—; X denotes —O—, —S—, —$SO_2$—, —$CR_2$ or —CO—; R denotes —H, or $C_1$-$C_4$-alkyl; and n denotes 0 or 1; all quantities relate to the sum of A to D, and their sum must yield 100 mole %, whereby the molar ratio of (B +D) : C ranges from 0.9 : 1 to 1.1 : 1.

DETAILED DESCRIPTION OF THE PREFERRED EMBODIMENTS

The molding compounds of the present invention are comprised of liquid crystalline aromatic polyester imides and exhibit excellent melt flow properties, impact and notch resistance, high rigidity and high thermal stability. The molding compounds of the present invention will be discussed in more detail below.

Suitable aromatic hydroxycarboxylic acids (component A) are p-hydroxybenzoic acid, m-hydroxybenzoic acid, 1,4-hydroxynaphthoic acid, 2,6-hydroxynaphthoic acid and mixtures thereof.

Isophthalic acid, terephthalic acid, 1,4-, 1,5-, 2,6-, 2,7-naphthalenedicarboxylic acid, 4,4'-diphenylether dicarboxylic acid or 4,4'-benzophenone dicarboxylic acid or mixtures thereof are used as aromatic dicarboxylic acid component B.

The following compounds may be added as the aromatic dihydroxy compound component C : hydroquinone, resorcinol, 1,3-, 1,4-, 1,5-, 2,6-, and 2,7-dihydroxynaphthalene, 4,4'-dihydroxybiphenyl, 4,4'-dihydroxydiphenylether, 4,4'-dihydroxydiphenylsulfone, 4,4'-dihydroxydiphenylsulfide, 4,4'-dihydroxybenzophenone, bisphenol A and mixtures thereof.

The compounds of Component D having the structure

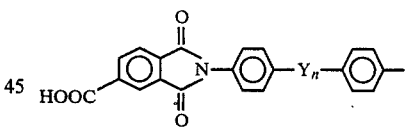

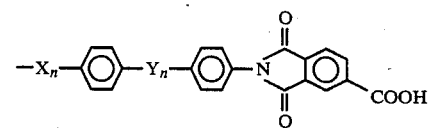

are bis-trimellitic acid imides. The imide portion is formed by reacting trimellitic acid or a derivative thereof such as the anhydride, with diamines such as 4,4'-bis(p-aminophenoxy)benzophenone, 4,4'-bis(p-aminophenylmercapto)benzophenone, 4,4'-bis(p-aminophenoxy)diphenlysulfone, 4,4'-bis(p-aminophenylmercapto)diphenylsulfone, 4,4'-bis(p-aminophenoxy)biphenyl, and 4,4'-bis(p-aminophenoxy)2,2-diphenylpropane.

Preferably p-hydroxybenzoic acid; isophthalic and-/or terephthalic acid; hydroquinone, 4,4'-dihydroxybiphenyl; and the bis-trimellitic acid imide with 4,4'-bis(4-aminophenoxy)diphenylsulfone as the diamine portion are added.

The component A is added preferably in quantities ranging from 20 to 60 mole %; the component B in quantities ranging from 10 to 38 mole %; the component C in quantities ranging from 20 to 40 mole %; and the component D, in quantities ranging from 2 to 20 mole %. The molar ratio of (B +D) : C ranges from 0.9 : 1 to 1.1 : 1, preferably from 0.97 : 1 to 1.04 : 1.

The quantities of the individual components relate to the sum of the components A to D and their sum must yield 100 mole %.

Any polymerization method that can be used for aromatic polyesters can be used to prepare the polyester imides of the present invention (e.g. US-PS No. 4,093,595, DE-OS 20 25 971, EP-OS 0,050,821 and US-PS No. 4,184,996). The added monomers can be present with their free end groups or also as derivatives thereof, e.g. with an ester, acid chloride or acyloxy group. The monomers can be reacted in the melt; however, the reaction can also take place in the presence of an inert heat exchanger, whereby the product precipitates as the suspension. In general the components A and C are added as acetates or bisacetates, and the components B and D are added as free dicarboxylic acids. When the free biphenols or hydroxycarboxylic acids are added, the acetates or bisacetates can be prepared in situ through preliminary reaction with acetic anhydride.

The speed of polycondensation can be increased by the addition of a conventional esterification catalyst (e.g. alkali acetate, alkaline earth acetate, zinc acetate; germanium dioxide, dialkyl tin oxide, ptoluenesulfonic acid). The catalyst quantity is approximately 0.0001 to 1% by weight, preferably between 0.01 and 0.2% by weight, based on the sum of the monomers.

In addition to this, the molecular weight of the present polyester imide can, if necessary, be further increased by means of a solid phase post-condensation, whereby the comminuted polymer is held for several hours in an inert atmosphere (e.g. nitrogen or vacuum) at temperatures ranging from 160 to 320° C.

The polyester imides of the present invention have a glass transition temperature (Tg) of more than 140° C., preferably between 150 and 210° C., and, generally, a crystalline melting point (Tm) of maximum 360° C. Those polyester imides that form a liquid crystalline melt above Tm (with amorphous polyester imides above Tg) are especially interesting. The viscosity of the solution should be at least 0.5 dl/g.

The polyester imides can be processed with conventional machines by means of injection molding or extrusion of the molding compounds of the invention.

The molding compounds may contain fillers such as talc; or reinforcers such as glass fibers, ARAMID ® or carbon fibers; and other conventional additives such as pigments or stabilizers.

The molding compounds can be processed in accordance with the conventional processes such as injection molding, extrusion and the like to prepare molded products, fibers, films, etc. Similarly the use of a liquid dispersion or a solution as a coating agent starting with a powder (e.g. dip coating in powder) is possible.

The molded products, manufactured from the molding compounds of the invention, are distinguished from prior art molding compounds by their low melt viscosity under processing conditions, excellent impact and notch resistance, high rigidity, and high thermal stability. They are non-flammable and extremely chemically resistant.

Other features of the invention will become apparent according to the following descriptions of the exemplary embodiments which are given for illustration of the invention and are not intended to be limiting thereof.

EXAMPLES

The parameters, cited in the specification and the examples, were determined with the aid of the following methods.

The reduced viscosity ($\eta_{red}$) is determined with a solution of the polymer (5 g/l) in phenol/o-dichlorobenzene 50/50 parts by weight at 25° C. in compliance with DIN 53,728.

The glass point (Tg) and the melting point (Tm) are determined with the aid of DSC at a heat up rate of 10° C./min.

The polarizing microscope examination for liquid crystalline nature is performed on a Leitz Orthoplan Pol microscope with 13-fold magnification and an FP 52 Mettler hot stage, which was redesigned to operate at temperatures up to 385° C. In this method, a straited texture with crossed polarizers indicates liquid crystalline properties.

Example 1

28.11 g (8.33 mole %) of the compound

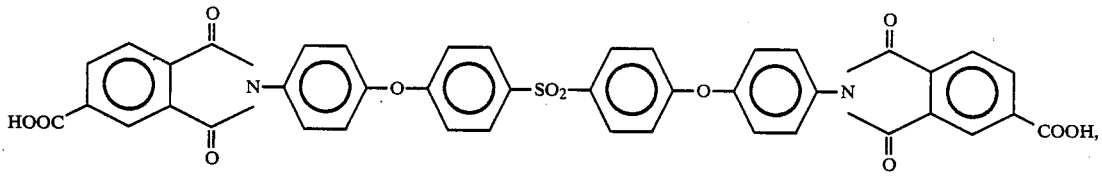

17.94 g isophthalic acid (25.00 mole %), 16.02 g hydroquinone (33.33 mole %), 19.89 p-hydroxybenzoic acid (33.33 mole %), 99 mg sodium acetate and 55 ml acetic anhydride were reacted for 2 hours at 130° C., then stirred for 30 min at 260° C., 280° C., 300° C. and 320° C. respectively, while the excess acetic anhydride and the acetic acid that formed was removed by means of distillation. The melt of this pre-condensate was removed and following cooling was milled, and post-condensed at 2 mbar (180° C., 200° C., and 250° C. for 30 minutes each, then at 280° C. for 3 hours and at 300° C. for 4 hours). The result was a polymer having a glass temperature Tg of 191° C. and a crystallite melting point Tm of 321° C. The polymer was liquid crystalline in the range from above Tm to the measuring limit (385° C.). $\eta_{red}$ : 0.93 dl/g.

Example 2

27.32 g (6.25 mole %) of the compound

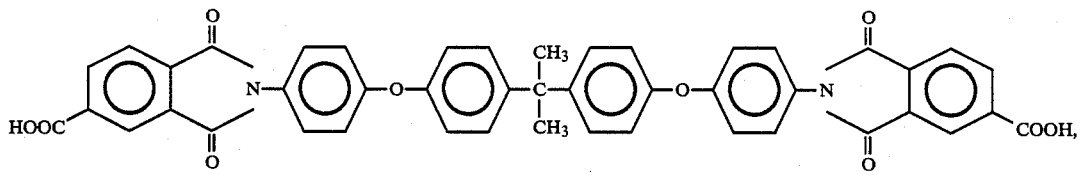

17.94 g isophthalic acid (18.75 mole %), 9.73 g 4,4'-diacetoxybiphenyl (6.25 mole %), 21.32 g hydroquinone diacetate (18.75 mole %), 51.90 g p-acetoxybenzoic acid (50.00 mole %) and 128 mg of sodium acetate were stirred at 260° C. for 30 min., 280° C. for 30 min., and 1 hour at 300° C. while the acetic acid that formed was removed by means of distillation. Then within 30 min. the pressure was lowered to 20 mbar and simultaneously the temperature was increased to 320° C. The result was a viscous, thread-forming melt. The polymer had a glass temperature Tg of 186° C.; the polarizing microscope examination showed liquid crystalline properties up to the measuring limit (385° C.). $\eta_{red}$: 1.07 dl/g.

Example 3

937.0 g (4.17 mole %) of the compound

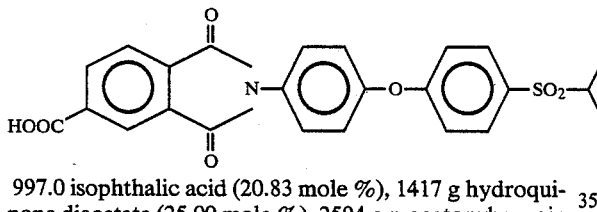

997.0 isophthalic acid (20.83 mole %), 1417 g hydroquinone diacetate (25.00 mole %), 2594 g p-acetoxybenzoic acid (50.00 mole %) and 1.476 g of sodium acetate were stirred at 260° C. for 45 min. and 270° C. for 45 min. while the acetic acid that formed was removed by means of distillation, then within 30 min. the temperature was increased to 320° C. and then within 15 min. to 330° C. Following removal, the product was milled to the size of granules and post-condensed in the solid phase at approximately 2 to 5 mbar for 16 hours at 200° C., 9 hours at 250° C. and 7½ hours at 300° C. The product (Tg=162° C.; Tm=355° C.) was molded into test pieces at an adjusted temperature of 360° C., a mass temperature of 376° C. and a molding temperature of 150° C. The following properties were determined:

notch resistance (DIN 53 453); 23° C.: 8/8 notched (31 kJ/m$^2$)
impact resistance (DIN 53 543); 23° C.: 8/9 notched (45 kJ/m$^2$)
tensile test in compliance with DIN 53 455; delta r (116 N/mm$^2$)
epsilon r (1.1%)
tensile E modulus (DIN 53 457): 12 070 N/mm$^2$
Vicat A/50 (DIN 53 460): 210° C.
Vicat B/50 (DIN 53 460): 160° C.
flammability (UL 94); V-0 (total burn time = 2 sec)
$\eta_{red}$: 0.84 dl/g The polarizing microscope examination showed liquid crystalline properties up to the measuring limit (385° C.).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letter patent of the united states is:
1. A molding compound, comprising:
   a thermoplastically processible, aromatic polyester imide consisting essentially of monomer units corresponding to the following starting monomers:
   (A) 10-70 mole % HO—Ar—COOH
   (B) 0-44 mole % HOOC—Ar'—COOH
   (C) 15-45 mole % HO—"Ar"—OH, and
   (D) 1-45 mole % of a compound having the structure

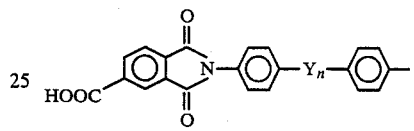

wherein Ar, Ar' and Ar" are the same or different; and are 1,3- or 1,4-phenylene; 1,4-; 1,5-; 2,6- or 2,7-naphthylene or

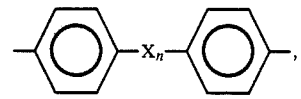

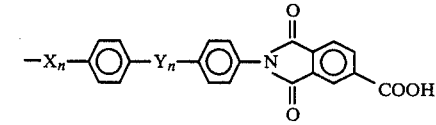

Y is —O— or —S—; X is —O—, —S—, —SO$_2$—, —CR$_2$- or —CO—; R is H, C$_1$–C$_4$-alkyl; and n is 0 or 1; and wherein all quantities relate to the sum of A–D, and said sum equals 100 mole %, whereby the molar ratio of (B +D) : C ranges from 0.9:1 to 1.1:1.
2. The molding compound of claim 1, wherein component A is selected from the group consisting of p-hydroxybenzoic acid, m-hydroxybenzoic acid, 1,4-hydroxynaphthoic acid, 2,6-hydroxynaphthoic acid and mixtures thereof.
3. The molding compound of claim 1, wherein component B is selected from the group consisting of isophthalic acid, terephthalic acid, 1,4-naphthalene dicarboxylic acid, 1,5-naphthalenedicarboxylic acid, 2,6-naphthalenedicarboxylic acid, 2,7-naphthalenedicarboxylic acid, 4,4'-diphenylether dicarboxylic acid, 4,4'-benzephenone-dicarboxylic acid and mixtures thereof.

4. The molding compound of claim 1, wherein component C is selected from the group consisting of hydroquinone, resorcinol, 1,3-dihydroxynaphthalene, 1,4-dihydroxynaphthalene, 1,5-dihydroxynaphthalene, 2,6-dihydroxynaphthalene, 2,7-dihydroxynaphthalene, 4,4'-dihydroxybiphenyl, 4,4'-dihydroxydiphenylether, 4,4'-dihydroxydiphenylsulfone, 4,4'-dihydroxydiphenylsulfide, 4,4'-dihydroxybenzophenone, bisphenol A and mixtures thereof.

5. The molding compound of claim 1, wherein component D is a bis-trimellitic acid imide prepared by reacting trimellitic acid or a derivative thereof with a diamine selected from the group consisting of 4,4'-bis(p-aminophenoxy)benzophenone, 4,4'-bis(p-aminophenylmercapto)benzophenone, 4,4'-bis(p-aminophenoxy)diphenylsulfone, 4,4'-bis(p-aminophenylmercapto)diphenylsulfone, 4,4'-bis(p-aminophenoxy)biphenyl, and 4,4'-bis(p-aminophenoxy)-2,2-diphenylpropane.

6. The molding compound of claim 1, wherein Ar is 1,4-phenylene.

7. The molding compound of claim 1, wherein Ar' is 1,3-phenylene, 1,4-phenylene or mixtures thereof.

8. The molding compound of claim 1, wherein Ar" is 1,4-phenylene, 4,4'-biphenylene or mixtures thereof.

9. The molding compound of claim 1, wherein component A is p-hydroxybenzoic acid, component B is isophthalic, terephthalic acid or mixtures thereof, component C is hydroquinone, 4,4'-dihydroxybiphenol or mixtures thereof, and component D is the bistrimellitic acid imide prepared by reacting trimellitic acid or a derivative thereof with 4,4'-bis(4-aminophenoxy)diphenylsulfone.

10. The molding compound of claim 1, wherein the molar ratio of (B+D):C ranges from 0.97:1 to 1.04:1.

11. The molding compound of claim 1, wherein the amount of component D is at least 10 mole % of the sum of the components B and D.

12. The molding compound of claim 1, wherein the amount of component D is at least 16 mole % of the sum of the components B and D.

13. The molding compound of claim 1, wherein said aromatic polyester imide has a glass transition temperature of between 150°–210° C.

14. The molding compound of claim 1, wherein said aromatic polyester imide has a viscosity of at least 0.5 dl/g as determined in a 50/50 parts by weight phenol/o-dichlorobenzene solution.

* * * * *